United States Patent
Anderson et al.

(10) Patent No.: US 11,148,714 B2
(45) Date of Patent: Oct. 19, 2021

(54) STEERING A DIFFERENTIAL STEERING MACHINE WHILE COMMANDED TO BE IN NEUTRAL

(71) Applicant: Caterpillar Inc., Deerfield, IL (US)

(72) Inventors: Randall T. Anderson, Peoria, IL (US);
Benjamin D. Miller, Peoria, IL (US);
Luke R. Sheley, Peoria, IL (US);
Michael Anthony Berry, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 366 days.

(21) Appl. No.: 16/266,456

(22) Filed: Feb. 4, 2019

(65) Prior Publication Data
US 2020/0247468 A1    Aug. 6, 2020

(51) Int. Cl.
*B62D 11/08*    (2006.01)
*B60W 30/18*    (2012.01)
*B62D 11/18*    (2006.01)

(52) U.S. Cl.
CPC ....... *B62D 11/08* (2013.01); *B60W 30/18109* (2013.01); *B62D 11/183* (2013.01); *B60W 2030/1809* (2013.01)

(58) Field of Classification Search
CPC ..... B62D 11/08; B62D 11/183; B62D 11/003; B62D 11/02; B62D 5/04; B62D 5/06; B60W 30/18109; B60W 2030/1809; B60K 17/16
See application file for complete search history.

(56) References Cited

U.S. PATENT DOCUMENTS

| | | | | |
|---|---|---|---|---|
| 6,039,132 A | * | 3/2000 | Easton | B62D 11/183 180/6.44 |
| 2018/0065629 A1 | * | 3/2018 | Wolff | B60L 7/12 |
| 2018/0148026 A1 | * | 5/2018 | York | B60T 8/3215 |
| 2020/0223435 A1 | * | 7/2020 | Wolff | B60L 50/13 |

FOREIGN PATENT DOCUMENTS

| | | | |
|---|---|---|---|
| JP | 2001163243 A * | 6/2001 | |
| JP | 4248714 B2 | 4/2009 | |

OTHER PUBLICATIONS

English Translation—JP-2001163243-A (Year: 2001).*

* cited by examiner

*Primary Examiner* — Joseph J Dallo
*Assistant Examiner* — Scott A Reinbold

(57) ABSTRACT

A method for steering a machine while commanded to be in neutral, including: sensing that a transmission is in a neutral setting; applying one or more service brakes into a braking mode; ramping off a steering pump on a hydraulic steering system; sensing a steering command; releasing the one or more service brakes from the braking mode in response to sensing the steering command; and ramping on the steering pump on the hydraulic steering system.

9 Claims, 3 Drawing Sheets

STEERING A DIFFERENTIAL STEERING MACHINE WHILE COMMANDED TO BE IN NEUTRAL

TECHNICAL FIELD

The present disclosure relates to a system and method of steering a machine with a differential steering arrangement while the transmission is commanded to be in neutral.

BACKGROUND

Differential steering systems are commonly used in many types of machines, including, for example, machines designed for agricultural and construction related activities. A differential steering system allows for the ability to steer or turn a machine by employing a drive wheel or track on one side of a machine and a second drive wheel or track on an opposing side of the machine and moving the first and second drive wheel or track at different speeds. If the first and second drive wheel or track move at the same speed, the machine will move in a straight line. The relative difference in speed causes the machine to turn in the direction of the slower wheel or track. The rate of turn, or turning radius, may be adjusted by increasing or decreasing the magnitude of difference in speed between the first and second drive wheel or track. Increasing the magnitude of difference in velocities results in a tighter turn, or a decreased turning radius. Decreasing the magnitude of difference in velocities results in a wider turn, or an increased turning radius.

In a typical machine with a differential steering system, disengaging the transmission into neutral allows for the drive wheels or tracks to continue to move. This may result in excessive wear or damage to a machine, particularly if the machine is on an incline. For instance, if the machine is on a sufficiently steep incline and the transmission is in neutral, gravity may cause the machine to move faster down the incline than the machine is designed to handle. This can result in excessive wear or failure of certain machine components.

Accordingly, a machine with differential steering system that ameliorates at least one of the deficiencies indicated above is desired in the art.

SUMMARY OF THE DISCLOSURE

In one aspect of the present disclosure, a method for steering a machine while commanded to be in neutral, comprising sensing that a transmission has been commanded to be in a neutral setting; applying one or more service brakes into a braking mode; ramping off a steering pump on a hydraulic steering system; sensing a steering command; releasing the one or more service brakes from the braking mode in response to sensing the steering command; and ramping on the steering pump on the hydraulic steering system.

In another aspect of the present disclosure, a method for steering a machine while commanded to be in neutral, comprising: sensing the initiation of an initial steering command, sensing that a transmission is commanded to be in a neutral setting, sensing the completion of the initial steering command, applying one or more service brakes into a braking mode; ramping off a steering pump on a hydraulic steering system; sensing a secondary steering command; releasing the one or more service brakes from the braking mode; and ramping on the steering pump on the hydraulic steering system.

In yet another aspect of the present disclosure, a machine with a differential steering system, comprising: a transmission including one or more gears and a clutch, the transmission being capable of disengaging from the one or more gears into a neutral setting; a transmission output sensor configured to send a signal indicative of an output speed of the transmission; a transmission selection sensor configured to send a signal indicative of the selection of the one or more gears or the neutral setting of the transmission; a steering position sensor configured to send a signal indicative of the presence of a steering command; one or more service brakes; and a controller operatively coupled to the service brakes and the clutch, the controller configured to: receive the signals from the transmission output sensor, the transmission selection sensor, and the steering position sensor, apply the service brakes in response to receiving a signal from the transmission selection sensor that the transmission is in the neutral setting, apply the transmission clutch in response to receiving a signal from the transmission output sensor that the transmission has an output speed of zero, and release the services brakes in response to receiving a signal from the steering position sensor indicative of the presence of a steering command.

Other features and aspects of this disclosure will be apparent from the following description and the accompanying drawings.

BRIEF DESCRIPTION OF THE DRAWINGS

Further features and advantages of the invention will become apparent from the description of embodiments using the accompanying drawings. In the drawings.

DETAILED DESCRIPTION

Figure 1:
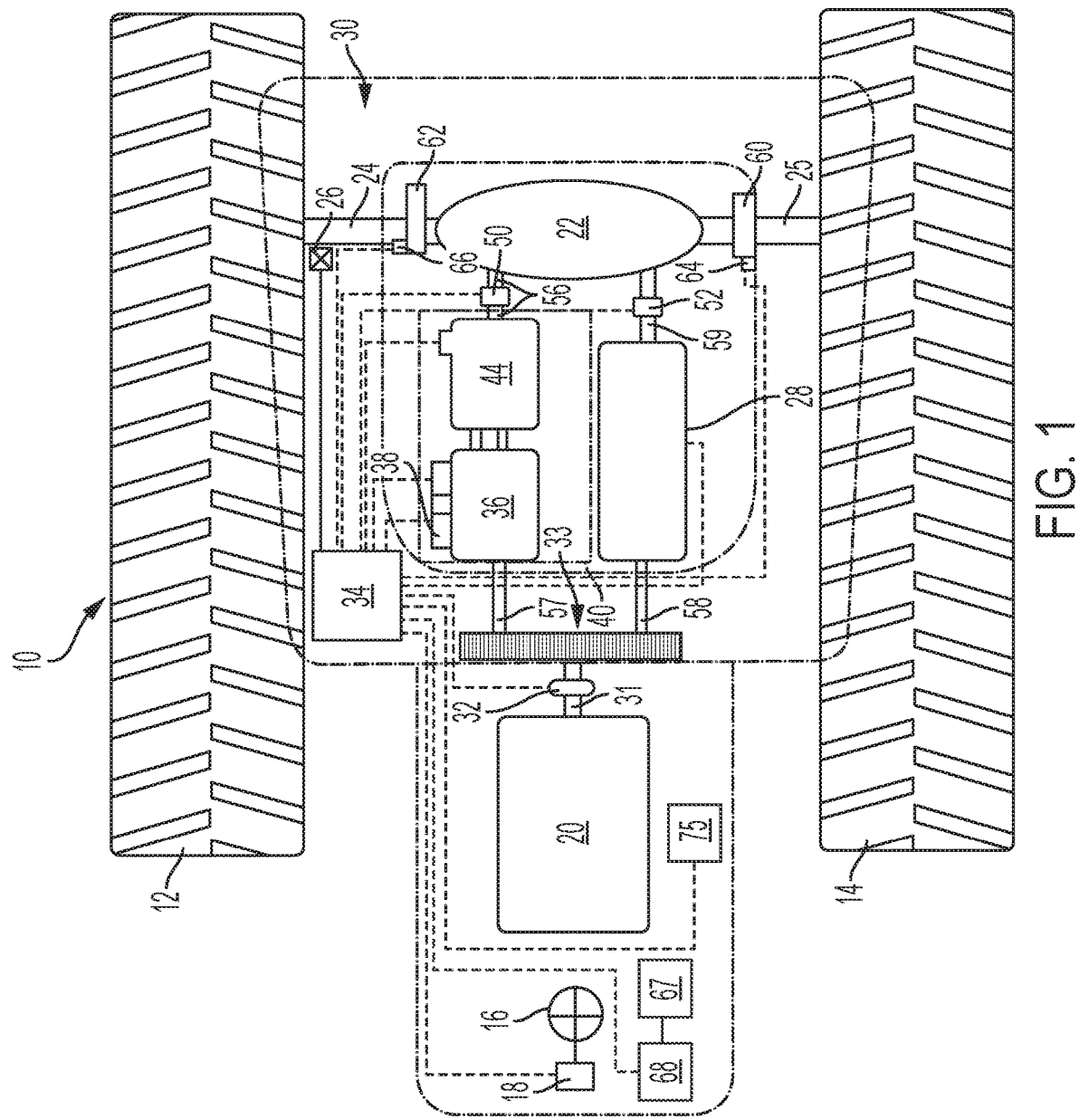
FIG. 1 is a schematic illustration of a differential steering machine.

Referring to the drawings, FIG. 1 is a schematic illustration of an exemplary machine 10 that includes a differential steering system 30. A machine 10 may be any type of wheeled or tracked machine that typically utilizes a differential steering system 30 to guide the machine 10. For example, the machine 10 may be an agricultural machine or a construction machine.

The machine 10 includes a first ground engaging traction device 12 and a second ground engaging traction device 14. The first and second ground engaging traction devices 12, 14 may be any type of device commonly used on a wheeled or tracked machine. For example, the first and second ground engaging traction devices 12, 14 may be continuous belts, tracks, or wheels.

The first and second ground engaging traction devices 12, 14 are driven by a first axle 24 and a second axle 25. Rotation of the first axle 24 causes a corresponding rotation of the first ground engaging traction device 12 and rotation of the second axle 25 causes a corresponding rotation of the second ground engaging traction device 14. A rotation of one or both of the first and second axles 24, 25 will propel the machine 10.

As also illustrated in FIG. 1, the machine 10 includes an engine 20 that drives the first and second axles 24, 25 to propel the machine 10. The engine 20 may be any type of power source capable of generating a rotational torque. For example, the engine 20 may be one or a combination of an internal combustion engine (such as a diesel engine or gas engine), a gas turbine, and an electrical motor that rotates an engine shaft 31.

The rotational torque exerted on the engine shaft 31 is transmitted to the first and second axles 24, 25 through a transmission 28 and a differential 22. The engine shaft 31 is connected to a transmission input shaft 58 through a gear assembly 33. The gear assembly 33 translates the rotation of the engine shaft 31 into a corresponding rotation of transmission input shaft 58.

The transmission 28 includes one or more gears (not shown). In certain embodiments, the transmission provides a series of gears that provide a range of gear ratios for the machine. Engagement of a particular gear ratio connects the transmission input shaft 58 with a transmission output shaft 59. The selected gear ratio translates the rotation of transmission input shaft 58 into a corresponding rotation of the transmission output shaft 59. The speed of the rotation of the transmission output shaft 59 depends upon the selected gear ratio. An operator may utilize the transmission 28 to select a particular gear ratio depending upon the desired speed of the machine 10. Alternatively, the transmission 28 may be disengaged from the one or more gears in to a neutral setting.

The transmission output shaft 59 provides an input rotation to the differential 22. The differential 22 converts the rotational speed of transmission output shaft 59 into corresponding rotations of the first axle 24 and the second axle 25. The differential 22 may include a gearing arrangement that allows the first axle 24 to be rotated at a different speed than the second axle 25. Connected to the first axle 24 and the second axle 25 are the service brakes 60, 62. Suitable brakes for use as the service brakes include wet friction discs actuated using hydraulic fluid. A single electrohydraulic pressure control valve (not shown) may be used to modulate the pressure to service brakes 60, 62. Each brake has a piston on which the fluid pressure acts to push against a spring. These brakes are fully engaged without any pressure and are fully released at high pressure, In other words, an inverse relationship exists, where an increase in pressure reduces the braking capacity, which may be controlled by controller 34 (discussed in further detail below).

As illustrated in FIG. 1, the engine 20 may also be connected to a hydraulic steering system 40 through a gear assembly 33 and a pump shaft 57. The hydraulic steering system includes a steering pump 36 and a steering motor 44. The gear assembly 33 translates the rotation of the engine shaft 31 into a corresponding rotation of a pump shaft 57, which drives the hydraulic steering pump 36. The hydraulic steering pump 36 may be, for example, a variable capacity pump that governs the direction of flow of pressurized fluid.

Alternatively, the hydraulic steering system 40 may be an electrohydraulic steering system. In these embodiments, the hydraulic steering system 40 is not connected to the gear assembly 33. Instead, the pump shaft 57 powers an electric motor (not shown).

As illustrated in FIG. 1, the differential steering system 30 also includes a steering motor 44. The steering motor 44 may be any type of fluid motor configured to rotate in response to a flow of pressurized fluid. The steering motor 44 may be further configured to rotate the shaft 56 in opposite directions, based on the direction of the incoming pressurized fluid flow. For example, the steering motor 44 may be configured to rotate the shaft 56 in one direction when the hydraulic steering pump 36 generates the first flow of pressurized fluid in the first direction and to rotate the shaft 56 in the opposite direction when the hydraulic steering pump 36 generates the second flow of pressurized fluid in the second direction.

As illustrated in FIG. 1, the shaft 56 provides a second input to the differential 22. The shaft 56 is connected to the differential 22 through a gearing assembly that changes the relative rotational speed of the first axle 24 and the second axle 25 based on the direction and magnitude of the rotation of the shaft 56. For example, when the shaft 56 rotates in one direction, the gearing assembly modifies the differential 22 so that the first axle 24 rotates faster than the second axle 25. When the shaft 56 rotates in the opposite direction, the gearing assembly modifies the differential 22 so that the second axle 25 rotates faster than the first axle 24. When the shaft 56 is not rotating, the first axle 24 and the second axle 25 rotate at substantially the same speed. Thus, by varying the relative rotational speeds of the first axle 24 and the second axle 25, the rotational speeds of the first and second ground engaging traction devices 12, 14 may also be varied. In this manner, the machine 10 may be guided along a chosen path.

As further illustrated in FIG. 1, the machine 10 includes a steering interface 16, which may be, for example, a lever. An operator may adjust the steering interface 16 to turn the machine 10. A steering position sensor 18 may be connected to the steering interface 16. The steering position sensor 18 provides an indication of the current position of the steering interface 16.

The machine 10 may include a series of sensors disposed within the machine 10 to provide information on the current operating conditions of the machine 10. For example, an engine speed sensor 32 may be disposed on the engine shaft 31 to provide operating information about the engine 20. In addition, a ground speed sensor 26 may be connected to the first axle 24 to provide information regarding the speed at which the machine 10 is traveling. Also, a transmission output sensor 52 may be disposed on the transmission output shaft 59 to provide information on the operating speed of the transmission 28. The commands to the transmission 28 may be monitored using a transmission selection sensor 68. The transmission selection sensor 68 may be used to monitor a transmission selector interface 67, which may be, for example, a gear shifter or a toggle switch. An operator may adjust the transmission selector interface 67 to provide a command to engage in one or more gears of the transmission 28 or provide a command to disengage from one or more gears of the transmission 28 into neutral.

Additional sensors may be disposed in the differential steering system 30 to provide information regarding the operating conditions of the system. For example, a sensor 50 may be disposed on the shaft 56 to indicate the rotational speed of the shaft 56. The sensor 50 may be any device recognized by one skilled in the art as capable of providing an indication of when the shaft 56 begins to rotate, as well as an indication of the rotational speed of the shaft 56. Any additional or alternative sensors readily apparent to one skilled in the art as capable of providing information regarding these or other operating conditions of the machine 10 may also be included.

As illustrated in FIG. 1, a controller 34 is provided to control the machine 10. The controller 34 may include a computer, which has all components required to run an application, such as, for example, a memory, a secondary storage device, a processor, such as a central processing unit, and an input device. One skilled in the art will appreciate that this computer can contain additional or different components. Furthermore, although aspects of the present invention are described as being stored in memory, one skilled in the art will appreciate that these aspects can also be stored on or read from other types of computer program products or computer-readable media, such as computer chips and secondary storage devices, including hard disks, floppy disks, CD-ROM, or other forms of RAM or ROM.

The controller 34 may be configured to receive information from each of the operating condition sensors on the machine 10. The controller 34 may be connected to, for example, the steering position sensor 18 to receive steering command information, to the engine speed sensor 32 to receive engine speed information, to the ground speed sensor 26 to receive machine speed information, to the transmission output sensor 52 to receive transmission speed information, to the steering shaft speed sensor 50 to receive steering information, and to the transmission selection sensor 68 to receive information on commands for the engagement of a gear or the disengagement of the transmission into neutral.

The controller 34 is configured to receive the grade angle data from an inclination sensor 75. Those skilled in the art will appreciate that the inclination sensor 75 may be placed near or at the center of gravity of machine 10. However, the inclination sensor 75 may be placed at other locations and the data from the inclination sensor 75 may be adjusted mathematically to account for the distance and positioning in relation to the center of gravity. While shown as a single element in FIG. 1, inclination sensor 75 may include one or more sensors that are used to determine the grade angle of the ground on which machine 10 is positioned. In one or more embodiments, the inclination sensor 75 may include a pitch sensor (not shown) and a roll sensor (not shown) to determine the pitch and roll, respectively, of machine 10. In these embodiments, the data from the pitch sensor and a roll sensor may be used to determine the grade angle of the ground on which machine 10 is positioned.

The controller 34 is configured to receive the indication of the position of the steering interface 16 from the steering position sensor 18. The controller 34 receives a steering command when it determines that steering interface 16 has moved due to an operator initiating a turn (left or right) or a change in the turn radius of the machine 10. The steering command may indicate that the steering interface 16 has been moved to steer the machine 10 in a direction other than straight ahead.

In one or more embodiments, the controller 34 will only consider an input from steering interface 16 via steering position sensor 18 to be a steering command if it exceeds a certain threshold value. In these or other embodiment the input from the steering interface may be characterized in percent, where 0% indicates an input of steering interface 16 to drive straight and +/−100% indicates an input of the far extreme of a left or right turn of steering interface 16. For the purpose of this specification, threshold value for determining the presence of a steering command refer to both the positive (+) and the negative (−) percent value. For example, in certain embodiments, the threshold value for determining the presence of a steering command may be 3%, in other embodiments, 5%, in other embodiments 8% and in other embodiments 10%.

In one or more embodiments, the threshold value for determining the presence of a steering command may be variable. In these or other embodiments, one or more operating condition sensors on the machine 10 may be used to adjust the threshold value for determining the presence of a steering command to a higher or lower percentage. For example, in certain embodiments, the inclination sensor 75 may be used to determine grade angle of the ground on which machine 10 is positioned. In these or other embodiments, if inclination sensor 75 determines the grade angle is low (for example less than 5°), the threshold value for determining the presence of a steering command may be 3%, in other embodiments, 5%, in other embodiments 8% and in other embodiments 10%. In other embodiments, if inclination sensor 75 determines the grade angle is high (for example between 5° and 30°), the threshold value for determining the presence of a steering command may be 15%, in other embodiments, 20%, in other embodiments 25% and in other embodiments 30%. In other embodiments, if inclination sensor 75 determines the grade angle is high (for example greater than 30°), the threshold value for determining the presence of a steering command may be 75%, in other embodiments, 80%, in other embodiments 85% and in other embodiments 90%. In one or more embodiments, the threshold value for determining the presence of a steering command may be adjusted via a mathematical relationship so that as a grade angle increases the threshold value for determining the presence of a steering command increases. Examples of mathematical relationships include linear, logarithmic, and exponential relationships. In other embodiments, the threshold value for determining the presence of a steering command may be adjusted via a look-up table, where a certain grade angle or range of grade angles corresponds to a threshold value for determining the presence of a steering command.

The controller 34 may be configured to control certain functions of the machine 10. The controller 34 may use one or more controlling means such as actuators, pumps, or motors, to control various functions of the machine. For example, controller 34 may control the service brakes 60, 62 by activating brake controllers 64, 66. One or both of service brakes 60,62 may be activated using, for example, an electrohydraulic pressure control valve. The transmission 28 may also be controlled by controller 34. In one or more embodiments, controller 34 may be used to operate a clutch or multiple clutches of the transmission 28. In certain embodiments, the controller 34 uses the clutches to stop the movement of the transmission output shaft 59. The steering pump 36 may include a steering pump controller 38, which may be activated by controller 34 to ramp on or ramp off the steering pump. Ramping off the steering pump 36 functions to decrease the flow of the hydraulic steering system until the machine 10 is not capable of steering. Conversely, ramping on the steering pump 36 functions to increase the flow of the hydraulic steering system until the machine 10 is capable of being steered.

Figure 2:
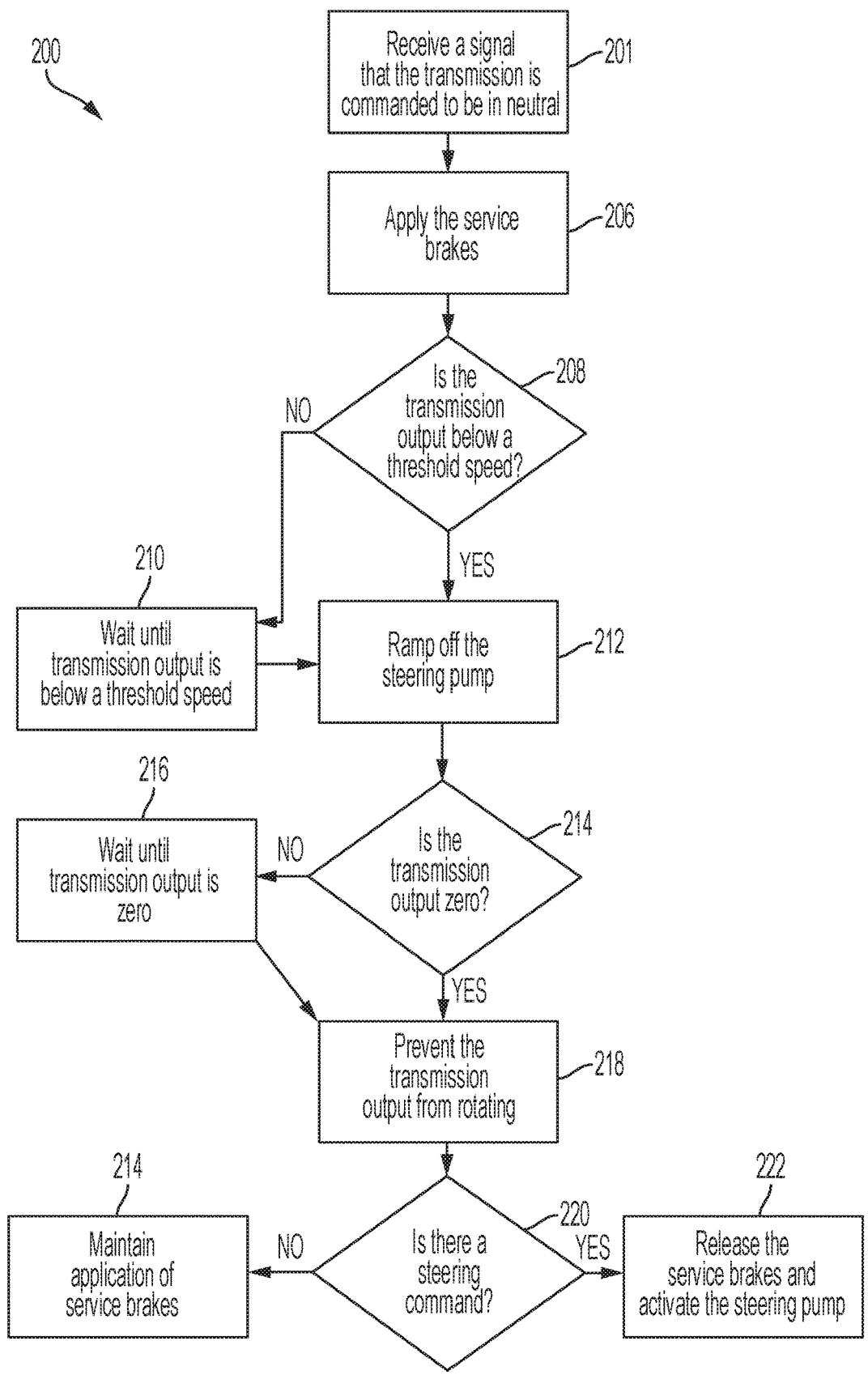
FIG. 2 is a flowchart for an exemplary embodiment of a method to steer a differential steering machine while in neutral.

Referring to FIG. 2, a flowchart for an exemplary embodiment of a method 200 for steering the machine 10 while commanded to be in neutral is provided. At step 201, the controller 34 receives a signal from transmission selection sensor 68 that the transmission 28 has been commanded to be disengaged from one or more gears and enter into the neutral setting. At step 206, the controller 34, in response to the signal that transmission has been commanded to be in neutral, sends a controlling signal to brake controllers 64, 66 to apply the service brakes 60, 62. At step 206, the controller 34 may use the brake controllers 64, 66 to enter the service brakes 60, 62 into a braking mode. In the braking mode, the controller 34 may determine if the machine is in motion, for example, via the ground speed sensor 26 or transmission output shaft 59. If the machine is in motion when entering the braking mode, the controller 34 uses the brake controllers 64, 66 to adjust the braking of the service brakes 60, 62 to bring the machine 10 to a stop. If the machine is not in motion when entering the braking mode, the controller 34 uses the brake controllers 64, 66 to adjust the braking of the service brakes 60, 62 to maintain the machine 10 in a stopped position.

At step 208, the controller 34 receives a signal from the transmission output sensor 52 to determine if the transmission output shaft 59 is in motion. If the transmission output shaft 59 is not in motion, the controller 34 may proceed to step 212 and ramp off the steering pump 36. Similarly, if the transmission output shaft 59 is in motion but below a threshold speed, the controller 34 may proceed to step 212 and ramp off the steering pump 36. If the transmission output shaft 59 is above a threshold speed, the controller 34 will continue to monitor the transmission output sensor 52 until the service brakes 60, 62 slow the machine 10 to a point where the transmission output shaft 59 is below the threshold speed and then the controller 34 will proceed to step 212 and send a signal to ramp off the steering pump 36. In one or more embodiments, the threshold speed of the transmission output shaft may be 150 revolutions per minute (RPM), in other embodiments 125 RPM, and in other embodiments 100 RPM.

After ramping off the steering pump 36, the controller 34 proceeds to step 214, where the controller 34 receives a signal from the transmission output sensor 52 to determine if the transmission output shaft 59 has stopped. Alternatively, the controller 34 may use the same determination from step 208 and proceed directly to step 216 or 218. If at step 214, the controller determines the transmission output shaft 59 has stopped (i.e. an output of zero), the controller 34 may proceed to step 218 and prevent the transmission output shaft 59 from rotating. The transmission output shaft 59 may be prevented from rotating by a command from the controller 34 signaling the transmission 28 to apply one or more clutches. If the transmission output shaft 59 is in motion at step 214, the controller 34 will proceed to step 216 and continue to monitor the transmission output sensor 52 until the service brakes 60 and 62 slow the machine 10 to a point where the transmission output shaft 59 is no longer in motion and then the controller 34 will proceed to step 218 and stop the transmission output shaft 59 from rotating. In certain embodiments, there is a debounce period or waiting between the step of determining that the transmission output shaft 59 is not in motion at step 214 and step 218. In one or more embodiments the wait period may be from about 0.1 to about 0.5 seconds.

After step 218, the controller 34 will check for a steering command signal from the steering position sensor 18. In the absence of a steering command, the controller 34 will proceed to step 224 and maintain the application of service brakes 60, 62. If a steering command is received, the controller 34 will signal the brake controllers 64, 66 to release the service brakes 60, 62. Further, after the steering command is received by the controller 34, the controller 34 will signal the steering pump controller 38 to ramp up the steering pump 36 and allow the steering motor 44 to steer the machine 10.

At any point, the method 200 may be stopped by a command to engage of one or more gears on the transmission 28 (i.e. placing transmission in gear from neutral).

Figure 3:
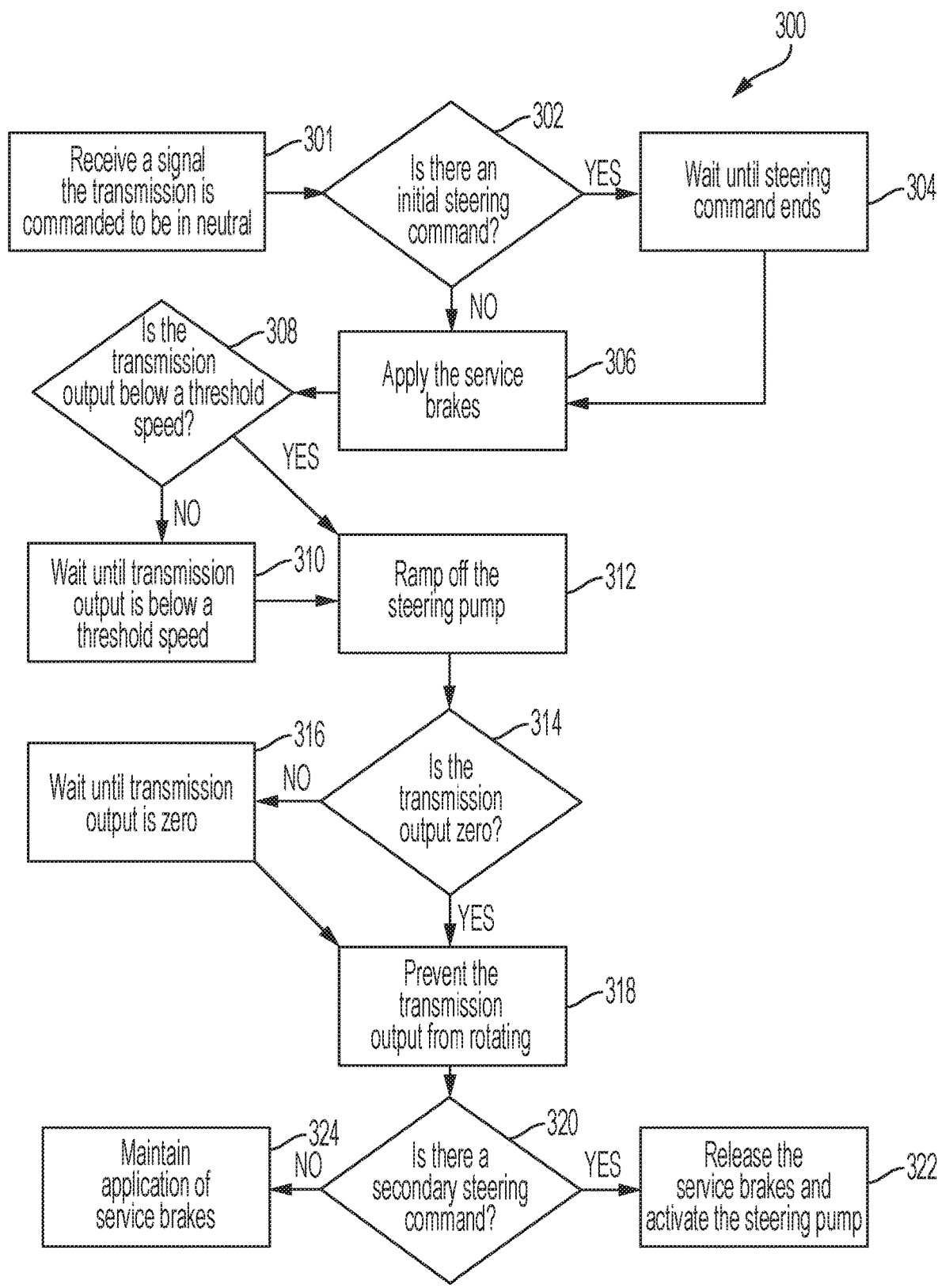
FIG. 3 is a flowchart for an exemplary embodiment of a method to steer a differential steering machine while in neutral.

Referring to FIG. 3, a flowchart for another exemplary embodiment of a method 300 for the steering machine 10 while commanded to be in neutral is provided. At step 301, the controller 34 receives a signal from the transmission selection sensor 68 that the transmission 28 has been commanded to be disengaged from one or more gears and enter into the neutral setting. At step 302, the controller 34, in response to the signal that the transmission has been commanded to be in neutral, determines if there is a present steering command via the steering position sensor 18. If there is a present steering command, the controller 34 will proceed to step 304 and wait until the steering command ends before proceeding to step 306. If there is no steering command, the controller 34 will proceed directly to step 306.

At step 306, the controller 34, in response to the signal that transmission has been commanded to be in neutral, sends a controlling signal to brake controllers 64, 66 to apply the service brakes 60, 62. At step 306, the controller 34 may use the brake controllers 64, 66 to enter the service brakes 60, 62 into a braking mode. In the braking mode, the controller 34 may determine if the machine is in motion, for example, via the ground speed sensor 26 or transmission output shaft 59. If the machine is in motion when entering the braking mode, the controller 34 uses the brake controllers 64, 66 to adjust the braking of the service brakes 60, 62 to bring the machine 10 to a stop. If the machine is not in motion when entering the braking mode, the controller 34 uses the brake controllers 64, 66 to adjust the braking of the service brakes 60, 62 to maintain the machine 10 in a stopped position.

At step 308, the controller 34 receives a signal from the transmission output sensor 52 to determine if the transmission output shaft 59 is in motion. If the transmission output shaft 59 is not in motion, the controller 34 may proceed to step 312 and ramp off the steering pump 36. Similarly, if the transmission output shaft 59 is in motion but below a threshold speed, the controller 34 may proceed to step 312 and ramp off the steering pump 36. If the transmission output shaft 59 is above a threshold speed, the controller 34 will continue to monitor the transmission output sensor 52 until the service brakes 60, 62 slow the machine 10 to a point where the transmission output shaft 59 is below the threshold speed and then the controller 34 will proceed to step 312 and send a signal to ramp off the steering pump 36. In one or more embodiments, the threshold speed of the transmission output shaft may be 150 revolutions per minute (RPM), in other embodiments 125 RPM, and in other embodiments 100 RPM.

After ramping off the steering pump 36, the controller 34 proceeds to step 314, where the controller 34 receives a signal from the transmission output sensor 52 to determine if the transmission output shaft 59 has stopped. Alternatively, the controller 34 may use the same determination from step 308 and proceed directly to step 316 or 318. If at step 314, the controller determines the transmission output shaft 59 has stopped (i.e. an output of zero), the controller 34 may proceed to step 318 and prevent the transmission output shaft 59 from rotating. The transmission output shaft 59 may be prevented from rotating by a command from the controller 34 signaling the transmission 28 to apply one or more clutches. If the transmission output shaft 59 is in motion at step 314, the controller 34 will proceed to step 316 and continue to monitor the transmission output sensor 52 until the service brakes 60 and 62 slow the machine 10 to a point where the transmission output shaft 59 is no longer in motion and then the controller 34 will proceed to step 318 and stop the transmission output shaft 59 from rotating. In certain embodiments, there is a debounce period or waiting between the step of determining that the transmission output shaft 59 is not in motion at step 314 and step 318. In one or more embodiments the wait period may be from about 0.1 to about 0.5 seconds.

After step 318, the controller 34 will check for a steering command signal from the steering position sensor 18. In the absence of a steering command, the controller 34 will proceed to step 324 and maintain the application of service brakes 60, 62. If a steering command is received, the controller 34 will signal the brake controllers 64, 66 to release the service brakes 60, 62. Further, after the steering command is received by the controller 34, the controller 34 will signal the steering pump controller 38 to ramp up the steering pump 36 and allow the steering motor 44 to steer the machine 10.

At any point, the method 300 may be stopped by command to engage of one or more gears on the transmission 28 (i.e. placing transmission in gear from neutral).

INDUSTRIAL APPLICABILITY

The present disclosure is generally applicable to system and method of steering a machine with a differential steering arrangement while the transmission is commanded to be in neutral. As indicated above, after commanding the disengagement the transmission into a neutral setting, the machine will either apply the service brakes or allow the machine to steer. This is advantageous, because the prevents a machine that is not in motion from moving while in neutral. Alternatively, if the machine is in motion it will prevent the machine from accelerating and may slow the machine to a stop. For instance, if a machine is moving down an incline, disengaging the transmission into neutral would typically result in the machine continuing down the incline and potentially accelerating. However, method of steering a machine with a differential steering arrangement while the transmission is commanded to be in neutral of the present specification would prevent this by either slowing the machine using the system brakes or steering the machine. As those skilled in the art will appreciate, steering a machine while on an incline with a significantly large steering command would prevent the machine traveling directly down the incline.

It will be appreciated that any of the methods or functions described herein may be performed by or controlled by the controller. Further, any of the methods or functions described herein may be embodied in a computer-readable non-transitory medium for causing the controller to perform the methods or functions described herein. Such computer-readable non-transitory media may include magnetic disks, optical discs, solid state disk drives, combinations thereof, or any other computer-readable non-transitory medium known in the art. Moreover, it will be appreciated that the methods and functions described herein may be incorporated into larger control schemes for an engine, a hybrid powertrain, a machine, or combinations thereof, including other methods and functions not described herein.

It will be appreciated that the foregoing description provides examples of the disclosed system and technique. However, it is contemplated that other implementations of the disclosure may differ in detail from the foregoing examples. All references to the disclosure or examples thereof, are intended to reference the particular examples being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

ELEMENT LIST

Element Number Element Name
10 machine
12 first ground engaging traction device
14 second ground engaging traction device
16 steering interface
18 steering position sensor
20 engine
22 differential
24 first axle
25 second axle
26 ground speed sensor
28 transmission
30 differential steering system
31 engine shaft
32 engine speed sensor
33 gear assembly
34 controller
36 steering pump
38 steering pump controller
40 hydraulic steering system
44 steering motor
50 sensor
52 transmission output sensor
56 shaft
57 pump shaft
58 transmission input shaft
59 transmission output shaft
60 service brakes
62 service brakes
64 brake controllers
66 brake controllers
67 transmission selector interface
68 transmission selection sensor
75 inclination sensor
200 method
201 step
206 step
208 step
212 step
214 step
216 step
218 step
224 step
300 method
301 step
302 step
304 step
306 step
308 step
312 step
314 step
316 step
318 step
324 step

What is claimed is:

1. A method for steering a machine while commanded to be in neutral, comprising:
    sensing that a transmission has been commanded to be in a neutral setting;
    applying one or more service brakes into a braking mode;
    ramping off a steering pump on a hydraulic steering system;
    sensing a steering command;
    releasing the one or more service brakes from the braking mode in response to sensing the steering command; and ramping on the steering pump on the hydraulic steering system.

2. The method of claim 1, where the machine is in motion and the braking mode slows the machine.

3. The method of claim 1, where the step of ramping off the steering pump on the hydraulic steering system is performed after a transmission output is determined to be below a threshold value.

4. The method of claim 1, where the step of ramping off the steering pump on the hydraulic steering system renders the hydraulic steering system unable to steer the machine, and the step of ramping on the steering pump on the hydraulic steering system allows the hydraulic steering system to steer the machine.

5. The method of claim 1, where the method further comprises a step of determining that a transmission output speed is zero and prohibiting the transmission output shaft from rotating using one or more transmission clutches.

6. The method of claim 5, where there is a waiting period of about 0.1 seconds to about 0.5 seconds between the step of determining that a transmission output speed is zero and prohibiting the transmission output shaft from rotating.

7. The method of claim 1, where the steering command requires an input from a steering interface exceeds a threshold value, and the threshold value is variable based upon a grade angle of the ground on which machine is positioned.

8. The method of claim 1, where the machine includes at least two ground engaging traction devices selected from belts, tracks, and wheels.

9. The method of claim 1, where the step of applying one or more service brakes into a braking mode further comprises determining the absence of a steering command.

\* \* \* \* \*